United States Patent
Onaka

(10) Patent No.: US 7,933,063 B2
(45) Date of Patent: Apr. 26, 2011

(54) MONITORING METHOD AND APPARATUS OF NOISE LIGHT DUE TO RAMAN AMPLIFICATION AND OPTICAL COMMUNICATION SYSTEM USING THE SAME

(75) Inventor: Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 365 days.

(21) Appl. No.: 12/289,469

(22) Filed: Oct. 28, 2008

(65) Prior Publication Data

US 2009/0237778 A1    Sep. 24, 2009

(30) Foreign Application Priority Data

Mar. 24, 2008  (JP) ................................. 2008-074866

(51) Int. Cl.
*H04B 10/12* (2006.01)
*H04B 10/17* (2006.01)

(52) U.S. Cl. ....................................................... 359/334
(58) Field of Classification Search .................... 359/334
See application file for complete search history.

(56) References Cited

U.S. PATENT DOCUMENTS

| | | | |
|---|---|---|---|
| 5,295,015 A | 3/1994 | Yoneyama | |
| 7,061,665 B2 * | 6/2006 | Sobe et al. | 359/334 |
| 7,139,117 B2 * | 11/2006 | Nakamura et al. | 359/334 |
| 7,312,918 B2 | 12/2007 | Ishikawa et al. | |
| 7,554,721 B2 * | 6/2009 | Hiraizumi et al. | 359/344 |
| 2003/0090780 A1 * | 5/2003 | Sobe et al. | 359/334 |
| 2004/0190123 A1 | 9/2004 | Nakamura et al. | |
| 2005/0024712 A1 | 2/2005 | Hiraizumi et al. | |
| 2005/0105167 A1 * | 5/2005 | Martinelli et al. | 359/334 |

FOREIGN PATENT DOCUMENTS

| | | |
|---|---|---|
| EP | 1 318 621 A2 | 6/2003 |
| EP | 1 624 596 A2 | 2/2006 |
| JP | 2006-189465 | 7/2006 |
| WO | 2004/105275 A1 | 12/2004 |

OTHER PUBLICATIONS

European Search Report mailed Jul. 6, 2009 and issued in corresponding European Patent Application 08018813.9.
M. Takeda et al., "Active Gain-Tilt Equalization by Preferentially 1.43 μm- or 1.48 μm-Pumped Raman Amplification", 10$^{th}$ Optical Amplifiers and Their Applications 1999, Technical Digest, 8 pages (Including cover pages).

* cited by examiner

*Primary Examiner* — Eric Bolda
(74) *Attorney, Agent, or Firm* — Staas & Halsey LLP

(57) ABSTRACT

A monitoring apparatus, based on an optical power monitored in photodetectors arranged at input and output ends of a transmission line, in a condition where pump light is supplied to the transmission line at a time of initial startup of an optical communication system, obtains a relationship for the noise light generated due to Raman amplification, between forward direction noise light power and backward direction noise light power, and while in service, converts the backward direction noise light power monitored by the photodetectors at the input ends of the transmission line into the forward direction noise light power in an arithmetic processing section, in accordance with the relationship obtained at the time of the initial startup. As a result the power of noise light generated due to Raman amplification, can be monitored in real time at high speed.

8 Claims, 6 Drawing Sheets

INFORMATION TRANSMISSION USING PATH OF OSC OR THE LIKE

EXAMPLE OF TRANSMISSION CHARACTERISTICS OF OPTICAL FILTER 41

EXAMPLE OF TRANSMISSION CHARACTERISTICS
OF OPTICAL FILTER 46

MONITORING METHOD AND APPARATUS OF NOISE LIGHT DUE TO RAMAN AMPLIFICATION AND OPTICAL COMMUNICATION SYSTEM USING THE SAME

CROSS-REFERENCE TO RELATED APPLICATION

This application is based upon and claims the benefit of priority of the prior Japanese Patent Application No. 2008-074866, filed on Mar. 24, 2008, the entire contents of which are incorporated herein by reference.

FIELD

The present invention relates to a method and apparatus for monitoring the power of noise light generated due to Raman amplification, in real time with good accuracy, and to an optical communication system that uses this.

BACKGROUND

As a background for the recent increase in communication traffic, the demand for optical communication/transmission apparatuses is increasing. Not only for optical repeating nodes introduced with backbone networks, but also recently, the introduction of optical transmission apparatuses for local networks is being actively performed. Furthermore, optical networks are also being formed for subscriber loops. In this manner, optical communication systems bear an important role with respect to world information networks.

As a typical optical communication system, an optical amplification repeating transmission system which has high reliability at a low cost and realizes large-capacity and long-distance transmission by arranging on a transmission line optical repeating nodes provided with wavelength division multiplexing (WDM) optical amplifiers such as for example erbium-doped fiber amplifiers (EDFA), becomes mainstream.

In such an optical amplification repeating transmission system, if the repeating distance between nodes becomes long, the losses of the transmission line increase. More specifically, the loss per unit length of the transmission line is generally around 0.2 dB/km, and the loss of transmission line of one repeating section increases corresponding to the repeating distance. Furthermore, in the case where various functional optical components are arranged on the transmission path, the transmission losses of these functional optical components add up so that the span losses become even greater. Therefore, the input level of the signal light to the WDM optical amplifier of each optical repeating node becomes smaller, and the OSNR (Signal-to-Noise Ratio) that expresses the intensity ratio between the signal light and the noise light is reduced, so that there is the possibility of deterioration in transmission characteristics. As one means for avoiding this deterioration in the transmission characteristics due to the increase in the span losses, there is known for example a distributed Raman amplifier (DRA) that supplies pump light to a transmission line arranged on an input side of a WDM optical amplifier, and Raman amplifies the signal light propagating through the transmission line using the amplification affect due the induced Raman scattering affect (refer for example to M. Takeda et al., "Active Gain-Tilt Equalization by Preferentially 1.43 μm- or 1.48 μm-Pumped Raman Amplification", OAA '99, ThA 3-1, 1999) and this is realized.

In a system which uses this Raman amplification in combination, under system requirements which generate a large span loss, a high gain is necessary for the signal light amplification device (EDFA, DRA or the like). Therefore, the power of the noise light generated from the amplification device also increases, so that the proportion of the signal light power with respect to the noise light power (OSNR) is reduced. Furthermore, for example as illustrated in FIG. 10, as the signal wavelength number included in the WDM light becomes less (the signal light is for one wave in the example of FIG. 10), the total power of the signal light is reduced, and hence the above mentioned proportion becomes smaller. Therefore, as one incident which becomes a problem, there is the reduction in the control accuracy at the control device involved with level adjustment of the signal light (for example the various control units equipped with optical amplifiers or variable optical attenuators), arranged downstream of the amplifying device that produces the noise light.

More specifically, in a common configuration of the above control device, a part of the light that includes the signal light and the noise light sent from the upstream side is branched in a branching coupler, and the total power of the branched light is monitored using a photodetector. Then, based on signal wavelength number information for which notification is received from an optical supervisory channel (OSC) or the like of the optical transmission system, the signal light power per one channel is obtained by dividing the monitored total power by the signal wavelength number, and the gain of the optical amplifier or the attenuation amount of the variable optical attenuator is controlled so that this becomes a desired level. As a matter of course, since control of the signal light is the object, if the noise light power with respect to the signal light power becomes large, the control accuracy deteriorates. In the case where the signal light power is not controlled to a normal level, there is the possibility that deterioration of transmission characteristics occurs. That is to say, if the signal light level becomes large, then waveform deterioration of the signal light due to the non linear affect on the transmission line occurs. Furthermore, if the signal light level is reduced, waveform deterioration of the signal light due to the influence of the OSNR drop occurs, so that there is a high possibility of reception error.

As a conventional technique for suppressing the above reduction in control accuracy due to noise light, for example it has been proposed to provide a cutoff section for transmitting/cutting off signal light to an input side of a transmission line, and vary the power of the Raman amplification pump light supplied to the transmission line, and change the status of the cutoff section depending on the variation of the pump light power, and then separately detect the signal light power and the noise light power based on a monitor value of the pump light power and a monitor value of the input light power to the downstream device, and correct the noise light (for example refer to International Publication Pamphlet No. WO 2004/105275).

Furthermore, for example a technique has also been proposed to monitor the power of the pump light supplied to the transmission line, compute the Raman gain from the monitor result, and calculate the generation amount of noise light based on this Raman gain and reflect this in the control (refer for example to Japanese Laid-open Patent Publication No. 2006-189465).

However, in the above conventional technique, in relation to the technique where a signal light cutoff section is provided and the noise light power is detected, since this is a method of cutting off the signal light on the input side of the transmission line, it is difficult to monitor the noise light power while in service. That is to say, there is a problem in that the influence of the noise light generated due to Raman amplification is monitored in real time, and this monitor result cannot reflect on control in the downstream control unit.

Furthermore, in relation to the technique for computing the generation amount of Raman gain and noise light power from the monitor results of the pump light power, this is effective in the case where there is a one-to-one relationship between the pump light power and the Raman gain. However, in general, the above relationship changes corresponding to the complex requirements of the transmission line (for example the type of transmission line, the coefficient of loss, the effective cross-sectional area, the length, and so forth). Moreover with regards to the relationship between the monitor value of the pump light power, and the pump light power actually supplied to the transmission line, it is difficult to consider that this continues as a one-to-one relationship during operation. Consequently, there is a problem in that it is difficult to monitor with good accuracy in real time the power of the noise light generated due to the Raman amplification. In contrast to this, for example it is considered to store the above relationship corresponding to the requirements of the transmission line in a database, and extract a relationship corresponding to the system requirements that is notified by a supervisory signal or the like, from the database, and compute the noise light power. However, in order to realize highly accurate computation, it is necessary to store an enormous amount of data, and it is not easy to realize a database of such an enormous size. Even if a database can be prepared temporarily, processing that takes time to select data suitable for the system requirements from amongst the data is necessary. Therefore there is a problem in that it is difficult to correspond to high speed control in the downstream control unit.

SUMMARY

The present invention addresses the above mentioned points, with an object of providing a monitoring method and apparatus that can monitor the power of noise light generated due to Raman amplification, in real time at high speed, and an optical communication system that uses this.

In order to achieve the above object, this monitoring method is a method for monitoring noise light generated due to Raman amplification, in an optical communication system that supplies pump light to an amplifying medium on a transmission line, and Raman amplifies a main signal light propagating through the amplifying medium and transmits this. One aspect of the method for monitoring noise light due to Raman amplification includes: supplying the pump light to the amplifying medium at a time of initial startup of the optical communication system, and obtaining a relationship for the noise light generated due to Raman amplification, between a power of forward direction noise light propagating in a same direction with respect to a propagation direction of the main signal light, and a power of backward direction noise light propagating in an opposite direction with respect to the propagation direction of the main signal light; monitoring a power of the backward direction noise light generated by the amplifying medium, during operation of the main signal light in the optical communication system; and converting a monitor value of the backward direction noise light power into the forward direction noise light power in accordance with the relationship obtained at the time of the initial startup.

Moreover an other aspect of a method for monitoring noise light due to Raman amplification includes: supplying pump light to the amplifying medium at a time of initial startup of the optical communication system, and obtaining a relationship for the noise light generated due to Raman amplification, between a power of forward direction noise light propagating in a same direction with respect to a propagation direction of the main signal light, and a power of lateral direction noise light radiating to an outside from a side face of the amplifying medium; monitoring a power of the lateral direction noise light generated in the amplifying medium, during operation of the main signal light in the optical communication system; and converting a monitor value of the lateral direction noise light power into the forward direction noise light power in accordance with the relationship obtained at the time of the initial startup.

According to the respective aspects of the method for monitoring noise light due to Raman amplification as described above, the power of the backward direction noise light or the lateral direction noise light due to Raman amplification is monitored during operation of main signal light in the optical communication system, and the monitor values are converted into the forward direction noise light power in accordance with the relationship obtained at the time of the initial startup. As a result the power of the Raman amplification noise light propagating in the same direction as the main signal light, can be monitored accurately and at high speed in real time. According to such a monitoring method, it is possible to also flexibly correspond to changes in the system requirements which also include changes that are produced transiently due to accidents and the like. Consequently, if the monitor results obtained by this monitoring method are used to perform correction of Raman noise light in a control unit inside a downstream side node of the optical transmission system, level adjustment of the main signal light can be performed at high control accuracy and at high speed.

Other objects, features, and advantages of the present invention will become apparent from the following description of the embodiments, in conjunction with the appended drawings.

DESCRIPTION OF EMBODIMENTS

Hereunder is a description of embodiments for carrying out the present invention, with reference to the appended drawings. Throughout all the figures, the same reference symbols denote the same or equivalent parts.

Figure 1:
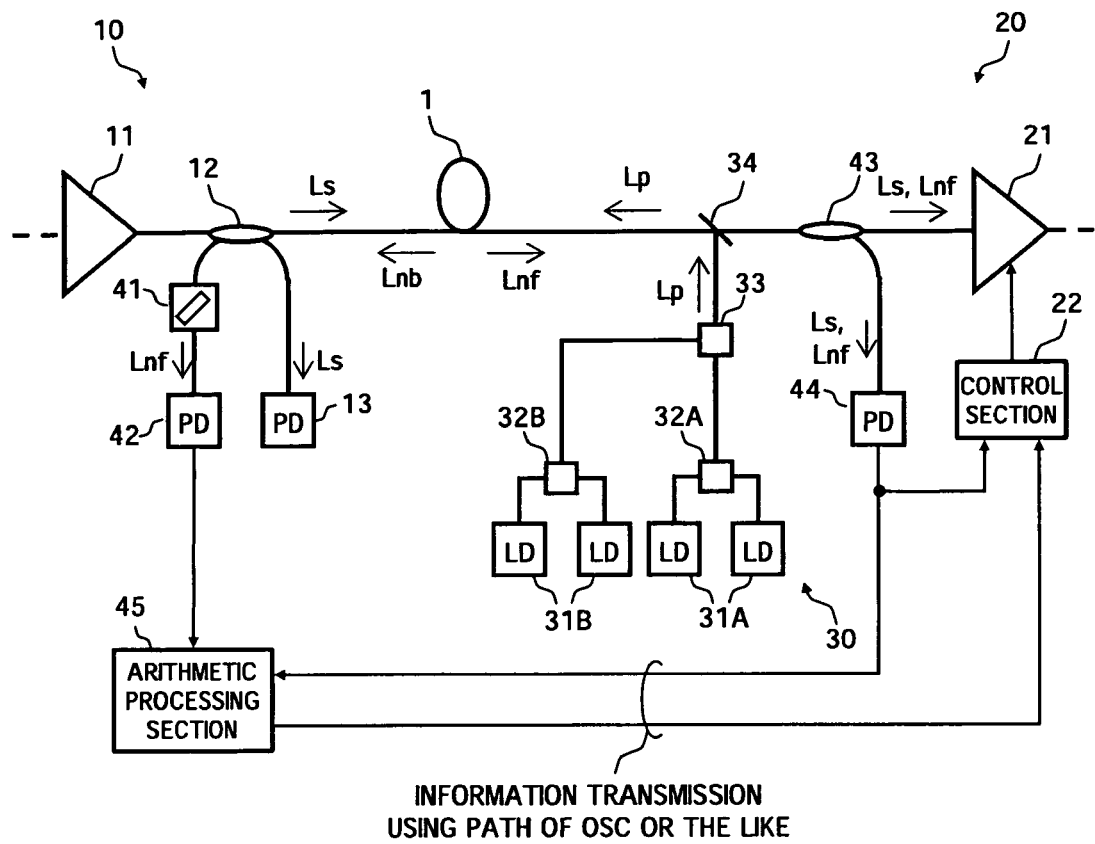
FIG. 1 is a block diagram illustrating a configuration of the main components in one embodiment of an optical communication system to which the noise light monitoring method according to the present invention is applied.

FIG. 1 is a block diagram illustrating a configuration of the main components in one embodiment of an optical communication system to which the noise light monitoring method according to the present invention is applied.

In FIG. 1, regarding this optical communication system, adjacent optical repeating nodes 10 and 20 are connected via a transmission line 1, and pump light Lp is supplied to the transmission line 1 from a distributed Raman amplifier (DRA) unit 30, and main signal light Ls transmitted from the optical repeating node 10 on the upstream side is transmitted to the optical repeating node 20 on the downstream side while being Raman amplified in the transmission line 1. At this time, as mentioned before, noise light due to Raman amplification in the transmission line 1 is generated. However in this embodiment, attention is paid to the fact that the noise light due to Raman amplification contains noise light Lnf propagating in the same direction with respect to the propagation direction of the main signal light Ls (hereunder forward direction noise light), and noise light Lnb propagating in an opposite direction with respect to the propagation direction of the main signal light Ls (hereunder backward direction noise light). In this optical transmission system; a divider 12 arranged on the transmission end of the transmission line 1, an optical filter 41, and a photodetector (PD) 42 are used, and the power of the backward direction noise light is monitored while in service, and the monitor value is converted into power of the forward direction noise light Lnf in an arithmetic processing section 45, and based on the result, noise light correction is performed at the time of level adjustment of the main signal light Ls in the downstream optical repeating node 20.

More specifically, the optical repeating node 10 on the upstream side is provided with an optical amplifier 11 that uses for example an erbium-doped optical fiber amplifier (EDFA) or the like to amplify the main signal light Ls up to a required level. The main signal light Ls amplified in the optical amplifier 11 is transmitted to one end of the transmission line 1, and at the same time one part is branched in the divider 12, and its optical power is monitored by a photodetector (PD) 13. Such an output monitoring configuration for the main signal light Ls that uses a divider 12 and a photodetector 13 is a common configuration in conventional optical repeating nodes. In this embodiment, the unused port (in FIG. 1 the port positioned at the bottom left) in the fiber type branching coupler having two-to-two ports, which is often used in the divider 12 in a normal output monitoring configuration, is used as the monitor port for the backward direction noise light Lnb. Here to the unused port of the divider 12 is connected the photodetector (PD) 42 for monitoring the power of the backward direction noise light Lnb, via the optical filter 41 for removing the pump light Lp.

Figure 2:
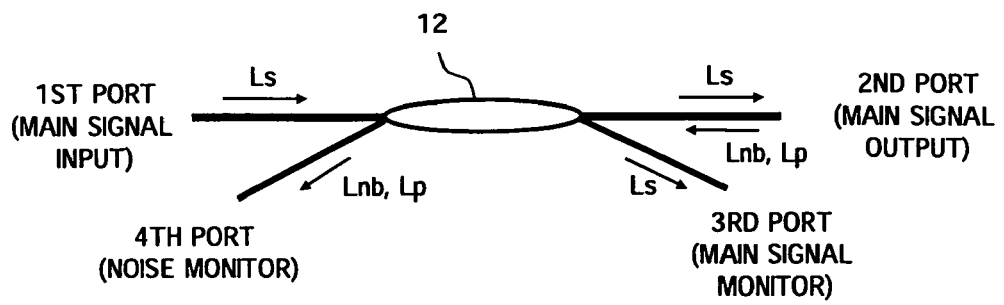
FIG. 2 is a diagram illustrating light that is input and output with respect to each port of a divider on an upstream side in the above embodiment.

FIG. 2 shows an enlargement of the light that is input and output with respect to each port of the divider 12. In such a divider 12, the main signal light Ls from the optical amplifier 11 is input to a first port at the top left. Then, the main signal light Ls is branched into two at a required ratio, and one part is output to a transmission end of the transmission line 1 from a second port at the top right, and the other part is output to the photodetector 13 from a third port at the bottom right. Furthermore, the pump light Lp and the backward direction noise light Lnb that are propagated in the opposite direction to the main signal light Ls on the transmission line 1 are input to the second port from the transmission end of the transmission line 1, and a part of the input light is output to the optical filter 41 from a fourth port at the bottom left. Regarding leakage into the fourth port, of the main signal light Ls which is input to the first port, since directivity of a 40 dB level is considered as the general characteristic of the divider, then compared to the power of the backward direction noise light Lnb, the power of the leakage light becomes sufficiently small so that it can be disregarded. Furthermore, a part of the input light to the second port is not only output to the fourth port, but is also output to the first port. However the output light for the first port is blocked by an optical isolator (omitted from the figure) that is usually provided at the output of the optical amplifier 11.

Figure 3:
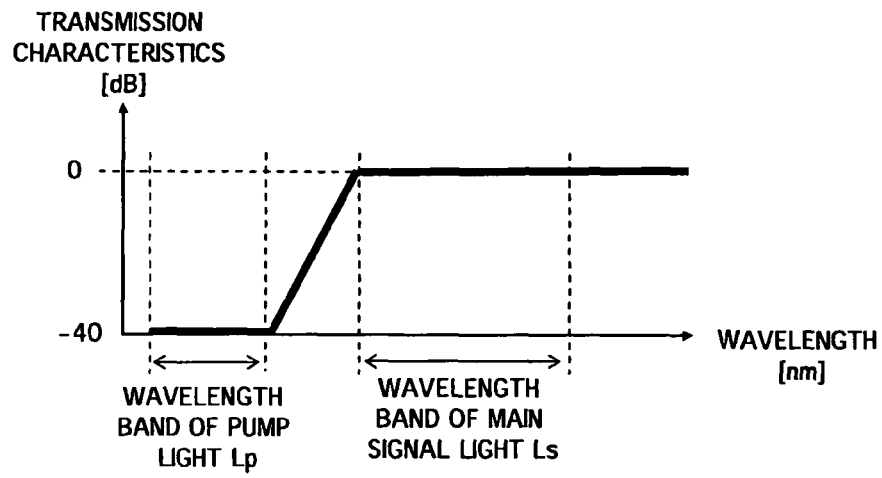
FIG. 3 is a diagram illustrating an example of transmission characteristics of an optical filter used in the above embodiment.

The optical filter 41 has a filter characteristic that contains the wavelength band of the main signal light Ls within the pass band for example as illustrated in FIG. 3, and contains the wavelength band of the pump light Lp within the cutoff band. This optical filter 41 passes the backward direction noise light Lnb corresponding to the wavelength band of the main signal light Ls, contained in the light output from the fourth port of the divider 12, and applies this to the photodetector 42, while it cuts off the remaining pump light Lp that does not contribute to Raman amplification in the transmission line 1. The photodetector 42 receives the backward direction noise light Lnb that has passed through the optical filter 41, and monitors the optical power Pnb, and outputs a signal indicating the monitor result to the arithmetic processing section 45.

The optical repeating node 20 on the downstream side is provided with an optical amplifier 21 that uses for example an erbium-doped optical fiber amplifier (EDFA) or the like to amplify the main signal light Ls transmitted on the transmission line 1 up to a required level, and the amplification operation is controlled by the control section 22. Furthermore, the prior stage of the optical amplifier 21 is provided with a divider 43 that branches a part of the light input from the transmission line 1 to the optical amplifier 21, and applies the light branched by the divider 43 to a photodetector 44 and monitors the power thereof. The monitor result in the photodetector 44 is transmitted to the arithmetic processing section 45 inside the optical repeating node 10 on the upstream side, using optical supervisory channel (OSC) light or the like that is transmitted and received between the respective nodes on the system. Furthermore, on the optical path between the reception end of the transmission line 1 and the input port of the divider 43, is provided a DRA unit 30. The DRA unit 30 has; a plurality of pump light sources (LD) 31A and 31B that generate pump light of a wavelength capable of Raman amplifying the main signal light Ls, multiplexers 32A, 32B and 33 for multiplexing the output light of the respective pump light sources 31A and 31B into one beam, and a multiplexer 34 for transmitting the pump light Lp multiplexed by the multiplexer 33 onto the transmission line 1, and Raman amplifies the main signal light Ls propagating on the transmission line 1 by means of the pump light Lp supplied from the multiplexer 34 to the transmission line 1.

Next is a description of the operation of the present embodiment.

In the optical communication system as described above, by supplying pump light Lp from the DRA unit 30, Raman amplification is performed on the main signal light Ls with the transmission line 1 as the amplifying medium. At this time, inside the amplifying medium, for example as illustrated in the schematic diagram of FIG. 4, noise light due to Raman amplification is generated, and this noise light is separated into forward direction noise light Lnf propagating in the same direction as the main signal light Ls, backward direction noise light Lnb propagating in the opposite direction to the main signal light Ls, and noise light Lnl radiating to the outside from a side face of the amplifying medium (hereunder called lateral direction noise light).

Regarding this generation of the forward direction noise light Lnf, the backward direction noise light Lnb, and the lateral direction noise light Lnl by Raman amplification, a similar physical phenomena is also known to occur in optical fiber amplifiers such as an EDFA (for example refer to; L. Eskildsen and E. L. Goldstein, "High-performance amplified optical links without isolators or bandpass filters", IEEE Photonics Technology Letters, Vol. 4, No. 1, January 1992, p. 55-58, and Shinji Yamashita, Takanori Okoshi, "Characteristic analysis of optical fiber amplifiers—characteristic improvement by part-way insertion of isolator, and characteristic deterioration due to reflection", The Institute of Electronics, Information and Communication Engineers, Optical Communication System Society, OCS 92-27, June 1992). An analogical inference is that the theory of this occurrence is also basically the same in Raman amplification. In this case, the respective powers of the forward direction noise light Lnf and the backward direction noise light Lnb generated due to Raman amplification with backward pumping, can be considered to be those that change with the relationship as illustrated by the dotted line at the bottom of FIG. 4, in the longitudinal direction of the amplifying medium (transmission line 1).

Figure 4:
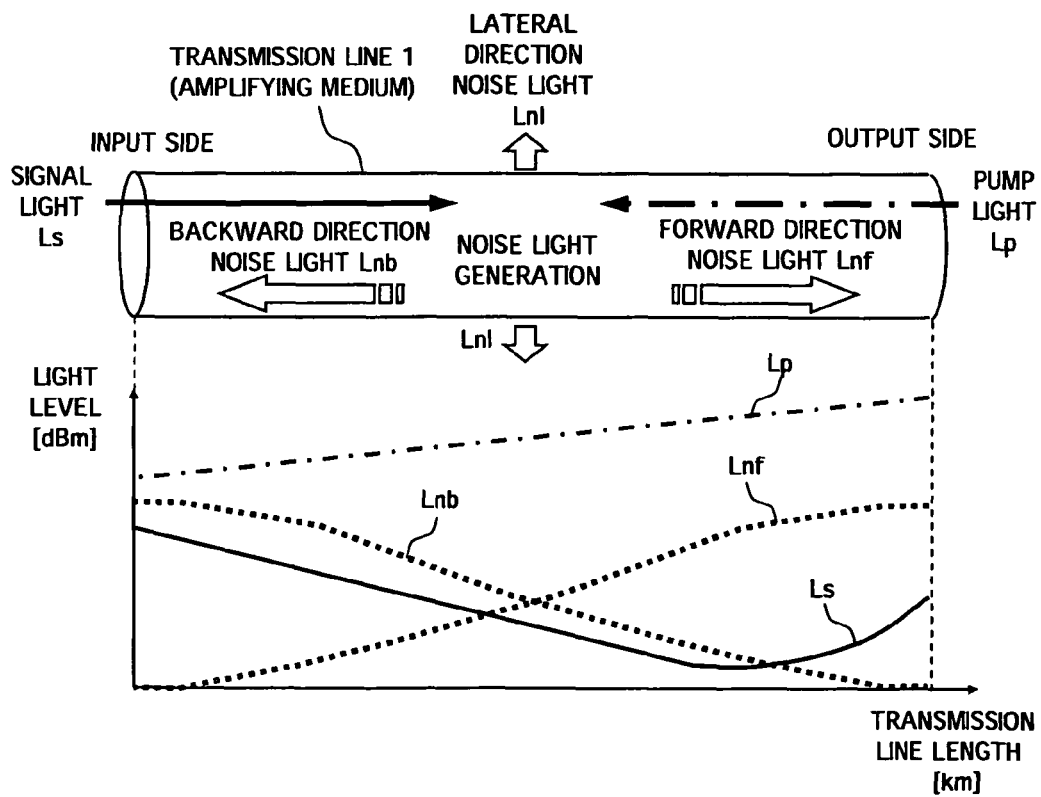
FIG. 4 is a schematic diagram for explaining noise light due to Raman amplification generated inside an amplifying medium.

In FIG. 4, distributed Raman amplification is assumed with the X-axis direction as the transmission line length. However for example also in the case of centralized Raman amplification with a dispersion compensated fiber or the like on the transmission line as the amplifying medium, a similar relationship can be considered. In the case of centralized Raman amplification, the position for monitoring the backward direction noise light Lnb (the position of the divider 12) can be the main signal light input end of the amplifying medium of the dispersion compensated fiber or the like. In centralized Raman amplification, compared to distributed type Raman amplification, the Raman gain in the vicinity of the main signal light input end of the amplifying medium is generally large. Therefore the monitored noise light is also large, and it is possible to monitor the noise light with a good accuracy by applying the present monitoring method.

Figure 5:
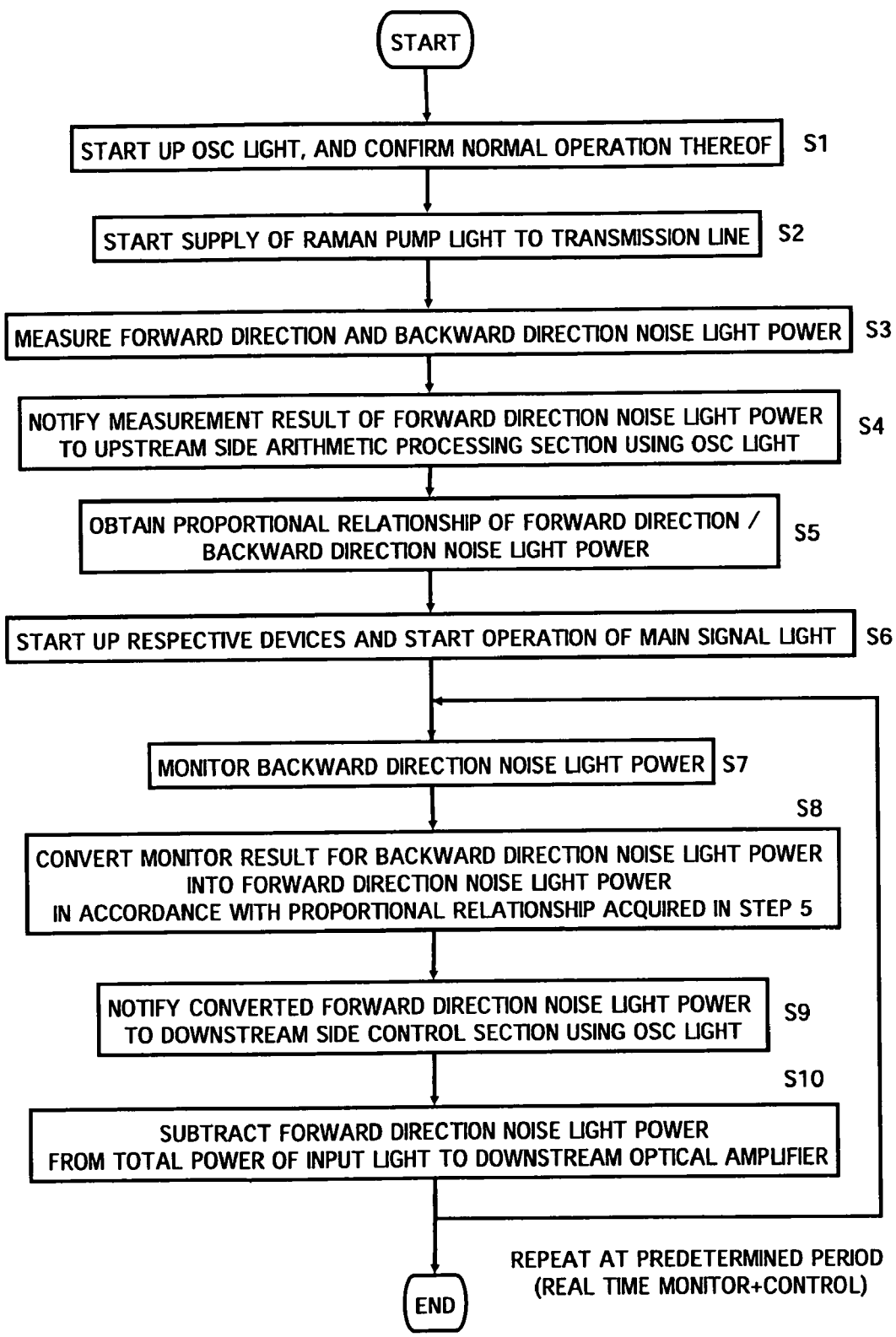
FIG. 5 is a flow chart for explaining a monitoring method for noise light due to Raman amplification in the above embodiment.

Based on the above mentioned relationship between the forward direction noise light Lnf and the backward direction noise light Lnb, in the present optical transmission system, for example following the procedures as illustrated in the flow chart of FIG. 5, the noise light due the Raman amplification is monitored in real time, and the result is here reflected in the control of the optical amplifier 21 on the downstream side.

More specifically, in step 1 of FIG. 5 (denoted by S1 in the figure, and similarly hereunder), at the time of initial startup of the system, at first the supervisory channel light is started up, and it is confirmed that operation of the OSC light between the respective nodes is being performed normally. Then in step 2, the respective pump light sources 31A and 31B of the DRA unit 30 are started, and supply of pump light Lp to the transmission line 1 is commenced.

Figure 6:
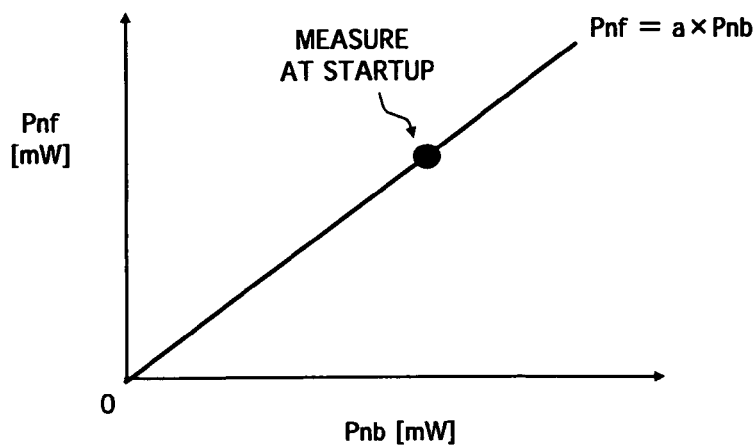
FIG. 6 is a diagram illustrating a proportional relationship for forward direction and backward direction noise light power.

Next in step 3, in a condition with no input of the main signal light Ls to the transmission line 1, the powers Pnf and Pnb of the forward direction noise light Lnf and the backward direction noise light Lnb generated in the transmission line 1 are respectively measured by the photodetectors 44 and 42. In step 4, the information related to the measurement result of the forward direction noise light power Pnf in the photodetector 44 on the downstream side, is transmitted to the arithmetic processing section 45 of the optical repeating node 10 on the upstream side using the OSC light. Then, in step 5, in the arithmetic processing section 45, based on the measurement results of the respective photodetectors 42 and 44, a proportional relationship (more specifically a slope a of Pnf=a×Pnb) of the forward direction noise light power Pnf and the backward direction noise light power Pnb as illustrated for example in FIG. 6 is obtained. The information related to this proportional relationship is stored in a memory or the like (not illustrated in the figure) inside the arithmetic processing section 45. Here the proportional relationship is shown simplified as an example. However the relationship between the forward direction noise light power and the backward direction noise light power in the present invention is not limited to the above proportional relationship, and it is possible to suitably adopt a relationship (for example an exponential function or the like) in accordance with the physical phenomena of the Raman gain and the noise light.

When the processing at the time of initial startup by the above step 1 through step 5 is completed, then in the next step 6, the main signal light Ls is input to the transmission line 1 by starting up the respective devices of the optical amplifiers 11 and 21 and the like, and operation of the main signal light Ls between the respective optical repeating nodes 10 and 20 is commenced. Then in step 7, the power Pnb of the backward direction noise light Lnb generated in the transmission line 1 while in service, is monitored by the photodetector 42, and the monitor result is transmitted to the arithmetic processing section 45. Furthermore, in the photodetector 44 on the downstream side, the total power (input light power to the optical amplifier 21) of the main signal light Ls that has been Raman amplified, and the forward direction noise light power Pnf is monitored, and the monitor result is transmitted to the control section 22.

In step 8, in the arithmetic processing section 45, arithmetic processing to convert the value of the backward direction noise light power Pnb monitored by the photodetector 42 into the forward direction noise light power Pnf is executed in accordance with the proportional relationship acquired in the above mentioned step 5. Then in step 9, the value of the forward direction noise light power Pnf that has been calculated by the arithmetic processing section 45, is transmitted to the control section 22 of the optical repeating node 20 on the downstream side, using the OSC light. Continuing in step 10, in the control section 22, by subtracting the forward direction noise light power Pnf calculated in the arithmetic processing section 45 from the total power of the input light to the optical amplifier 21 monitored by the photodetector 44 on the downstream side, correction of the noise light due to Raman amplification is performed, and the amplification operation (gain) of the optical amplifier 21 is controlled in response to the input light power after correction.

By repeating the above described set of processing from step 7 through step 10 at a required period, the power of the noise light due to Raman amplification that is input to the optical amplifier 21 on the downstream side while in service, can be monitored accurately in real time, and by reflecting the monitor result in the control of the optical amplifier 21, it is possible to perform level adjustment of the main signal light Ls at a high control precision. Furthermore, in the present embodiment, since the arithmetic processing for converting the monitor value of the backward direction noise light power into forward direction noise light power is performed in accordance with a simple proportional relationship, it is also possible to correspond to high speed control in the optical amplifier 21 on the downstream side. Furthermore, by using the unused port of the divider 12 that is used for monitoring the output of the optical amplifier 11 on the upstream side, the backward direction noise light due to Raman amplification can be acquired with a simple configuration.

In the above embodiment, the configuration example is shown where the optical filter 41 that cuts off the residual pump light in the Raman amplification, is arranged on the previous stage of the photodetector 42 that monitors the backward direction noise light power. However this optical filter 41 may be omitted in the case where the power of the residual pump light due to system requirements of the transmission line length or the like is sufficiently smaller than the power of the backward direction noise light. Alternatively, the power of the residual pump light corresponding to the system requirements may be previously estimated, and then at the time of arithmetic processing in the arithmetic processing section 45, correction of the monitor value of the backward direction noise light may be performed.

Furthermore, with regards to causes of errors in the monitor value of the backward direction noise light power, as well as the residual pump light, for example reflected and returned light and the like of the main signal light due for example to Stimulated Brillouin Scattering (SBS) can be a cause of errors. In this case also, similar to with the above mentioned residual pump light, the power of the reflected return light and the like due to the SBS may be previously estimated, and then correction of the monitor light of the backward direction noise light Lnb performed. By performing this correction, the power of the noise light due to Raman amplification can be more accurately monitored. In the case where a backward direction pumping or both direction pumping rare-earth-doped optical fiber amplifier is applied as the optical amplifier 21 on the downstream side, the pump light of the EDFA also propagates in the opposite direction to the main signal light. However in general, in a rare-earth-doped optical fiber amplifier, an optical isolator is applied on the input and output side of the amplifying medium. Therefore the pump light of the rare-earth-doped optical fiber amplifier is not guided to the transmission line on the upstream side, and there is no particular need to consider this as a cause of error.

Furthermore, in the above embodiment, noise light correction in the control of the downstream optical amplifier 21 is performed using the noise light power due to Raman amplification which is monitored in real time. However the object of noise light correction in the present invention is not limited to control of the optical amplifier, and an optional control device (for example a variable optical attenuator or the like) that is involved with level adjustment of the main signal light, arranged in the downstream node may be the object of noise light correction.

Next is a description of an application example related to an optical communication system of the above embodiment.

Figure 7:
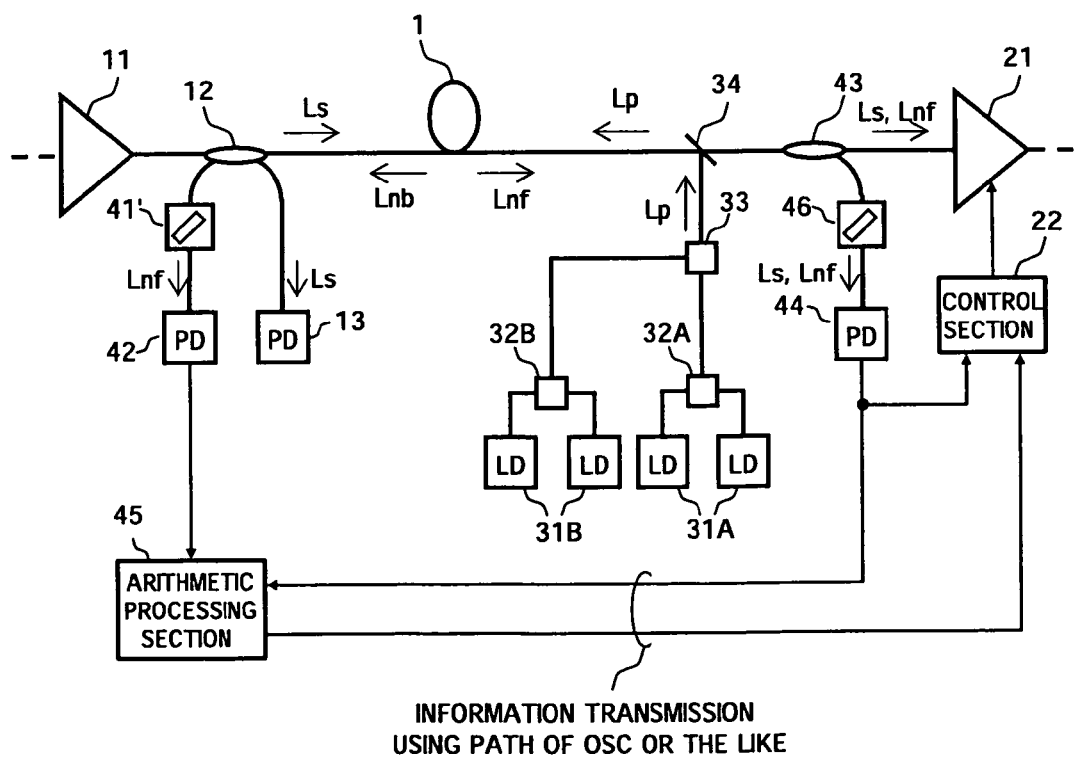
FIG. 7 is a block diagram illustrating a configuration of the main components in an application example of the above embodiment.

FIG. 7 is a block diagram illustrating a configuration of the main components in an application example of the optical communication system.

In FIG. 7, in this optical communication system, an optical filter 46 is added in the configuration of the aforementioned embodiment (FIG. 1), to a previous stage of the photodetector 44 that monitors the optical power input to the optical amplifier 21, inside the optical repeating node 20 on the downstream side. Other configuration other than the optical filter 46 is the same as for the case of FIG. 1, and hence description is omitted here.

Figure 8:
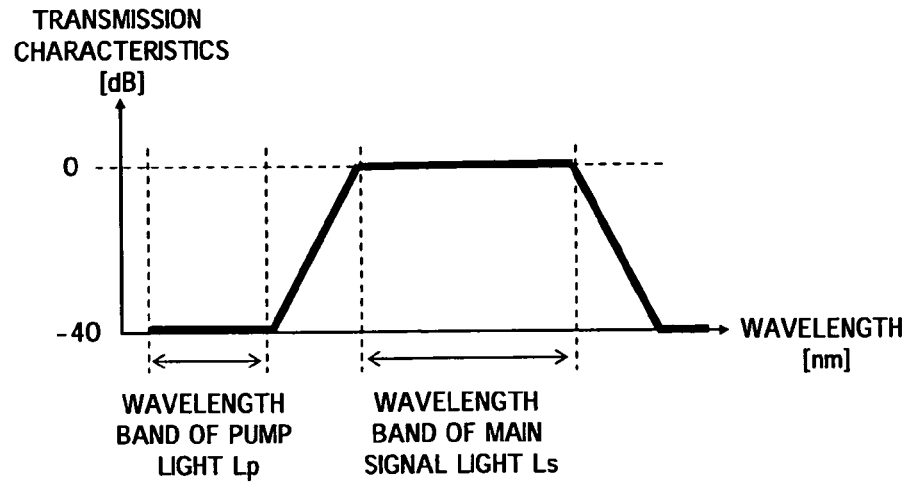
FIG. 8 is a diagram illustrating an example of transmission characteristics of an optical filter used in the above application example.

The optical filter 46, as illustrated for example in FIG. 8, is a band pass optical filter having a pass region equal to the wavelength band of the main signal light Ls. This optical filter 46 only passes light in the wavelength band of the main signal light Ls (more specifically the main signal light Ls that is Raman amplified in the transmission line 1 and the backward direction noise light Lnb), out of the light that is branched by the divider 43, and applies this to the photodetector 44, and cuts off light other than this.

By applying the above mentioned optical filter 46, light equivalent to the light that is input to the optical amplifier 21 on the downstream side is monitored by the photodetector 44. Therefore the control accuracy in the optical amplifier 21 on the downstream side can be further improved. That is to say, regarding the noise light due to Raman amplification, it is considered to convert the wavelength characteristics and the total power thereof in a complex manner in accordance with the operating conditions. Therefore light equivalent to the noise light that is Raman amplified and actually exerts an influence on the amplification operation of the optical amplifier 21 on the downstream side, is preferably that which is monitored in the photodetector 44. Generally, a rare-earth-doped optical fiber amplifier such as an EDFA that is arranged as a preamplifier at the reception end of the optical repeating node, has an amplification band corresponding to the wavelength band of the main signal light Ls. Therefore by limiting the wavelength band of the light that is monitored by the photodetector 44 to a wavelength band of the main signal light Ls using the optical filter 46, it is possible to realize a higher control accuracy. Also for an optical filter 41' provided on the previous stage of the photodetector 42 on the upstream side, a band pass optical filter having a transmission characteristic the same as for the optical filter 46 on the downstream side may be applied. By means of this, the control accuracy of the optical amplifier 21 on the downstream side can be even further increased.

Next is a description of another embodiment of an optical communication system to which the noise light monitoring method according to the present invention is applied.

Figure 9:
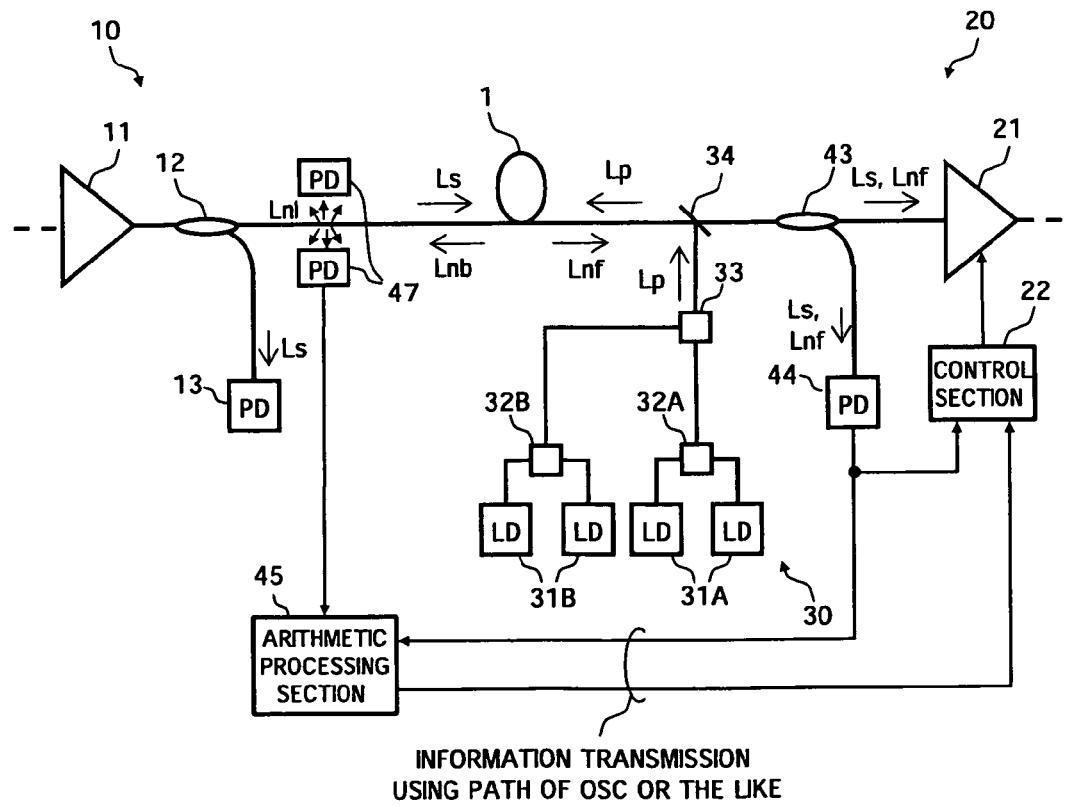
FIG. 9 is a block diagram illustrating a configuration of the main components in another embodiment of an optical communication system to which the noise light monitoring method according to the present invention is applied.
Figure 10:
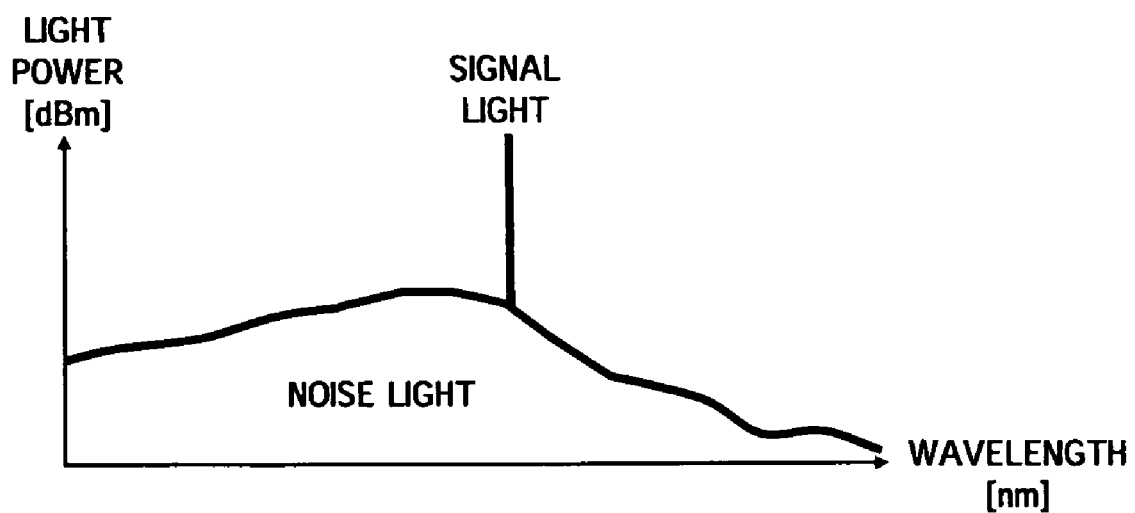
FIG. 10 is a diagram for explaining OSNR for when a number of signal wavelengths of WDM light is few.

FIG. 9 is a block diagram illustrating a configuration of the main components of the optical communication system according to this other embodiment.

In the above mentioned embodiment and its application example, the backward direction noise light of the noise light generated due to Raman amplification was monitored. In contrast to this, in the optical communication system of this embodiment, the lateral direction noise light Lnl (refer to FIG. 4) of the noise light generated due to Raman amplification is received by photodetectors 47 arranged in the vicinity of the side face of the transmission line 1, and the power thereof is monitored. These photodetectors 47 may be arranged at an arbitrary position in the lengthwise direction of the transmission line 1, and in the example of FIG. 9, the photodetectors 47 are arranged in the vicinity of the end on the upstream side. In the configuration of this optical communication system, excluding the point where the photodetectors 47 for monitoring the lateral direction noise light Lnl are provided instead of the photodetector 42 for monitoring the backward direction noise light, this is the same as the abovementioned configuration illustrated in FIG. 1.

Also in the case of monitoring the power of the lateral direction noise light Lnl with the photodetectors 47 by means of the above configuration, then similarly to the aforementioned case of monitoring the power of the backward direction noise light Lnb, at the time of initial startup of the system, the proportional relationship for the forward direction noise light power and the lateral direction noise light power is obtained, and then arithmetic processing for converting the monitor value of the lateral direction noise light power acquired while in service into forward direction noise light power is performed in accordance with this proportional relationship. As a result, the power of the noise light due to Raman amplification that is input to the optical amplifier 21 on the downstream side can be monitored accurately in real time, and by reflecting this monitor result in the control of the optical amplifier 21, it is possible to perform level adjustment of the main signal light Ls at a high control precision. Furthermore, when monitoring the power of the lateral direction noise light Lnl, the influence of reflected and return light and the like of the main signal light due to residual pump light or SBS is not received, and hence simplification of the monitoring configuration or the arithmetic processing becomes possible.

What is claimed is:

1. An apparatus for monitoring noise light generated due to Raman amplification, in an optical communication system that supplies pump light to an amplifying medium on a transmission line, and Raman amplifies a main signal light propagating through the amplifying medium and transmits this, the apparatus comprising:
    a first monitor section that acquires light propagating in an opposite direction with respect to a propagation direction of the main signal light, in the vicinity of a main signal light input end of the amplifying medium, and monitors a power thereof;
    a second monitor section that acquires light propagating in a same direction with respect to a propagation direction of main the signal light, in the vicinity of a main signal light output end of the amplifying medium, and monitors a power thereof; and
    an arithmetic processing section that, based on the optical power respectively monitored in the first and second monitor sections, in a condition where the pump light is supplied to the amplifying medium at a time of initial startup of the optical communication system, obtains a relationship for the noise light generated due to Raman amplification, between a power of the forward direction noise light propagating in a same direction with respect to a propagation direction of the main signal light, and a power of the backward direction noise light propagating in an opposite direction with respect to the propagation direction of the main signal light, and during operation of the main signal light in the optical communication system, converts the backward direction noise light power monitored by the first monitor section into the forward direction noise light power in accordance with the relationship obtained at the time of the initial startup.

2. An apparatus according to claim 1, wherein
    when the pump light supplied to the amplifying medium propagates in an opposite direction with respect to a propagation direction of the main signal light,
    the first monitor section has a first optical filter that, for light that is taken out from a vicinity of the main signal light input end of the amplifying medium, passes a light component corresponding to a wavelength band of the main signal light, and cuts off a light component corresponding to a wavelength band of the pump light.

3. An apparatus according to claim 1, wherein
    when the pump light supplied to the amplifying medium propagates in an opposite direction with respect to a propagation direction of the main signal light,
    the arithmetic processing section previously estimates a power of residual pump light that reaches a vicinity of the main signal light input end of the amplifying medium, and performs correction of the backward direction noise light power that is monitored by the first monitor section.

4. An apparatus according to claim 1, wherein
    the arithmetic processing section previously estimates a power of reflected and returned light of the main signal light due to Stimulated Brillouin Scattering, that reaches a vicinity of the main signal light input end of the amplifying medium, and performs correction of the backward direction noise light power that is monitored by the first monitor section, in accordance with the reflected and returned light power.

5. An optical communication system provided with a plurality of nodes connected to each other via a transmission line, and a Raman amplifying unit that supplies pump light to an amplifying medium on the transmission line and Raman amplifies main signal light propagating through the amplifying medium,
    wherein there is provided an apparatus according to claim 1,
    and a downstream side node of the plurality of nodes includes a control unit that performs level adjustment of the main signal light, and the control unit has a control section that, for total power of input light, performs correction using the forward direction noise light power that has been converted in the arithmetic processing section of the apparatus, and performs level adjustment of the main signal light corresponding to input light power after the correction.

6. An optical communication system according to claim 5, wherein
    when an upstream side node of the plurality of nodes is equipped with a divider that branches a part of the main signal light output to the transmission line, and a photodetector that monitors a power of the main signal light branched by the divider,
    the first monitor section of the apparatus uses an unused port of the divider to take out light that propagates in an opposite direction with respect to a propagation direction of the main signal light.

7. An optical communication system according to claim 5, wherein
    the control unit includes a rare-earth-doped optical fiber amplifier,
    and the second monitor section of the apparatus has a second optical filter that, for light that is taken out from a vicinity of the main signal light output end of the amplifying medium, passes only a light component corresponding to a wavelength band of the main signal light.

8. An optical communication system according to claim 5, wherein the control unit includes a variable optical attenuator.

* * * * *